Figure 1:
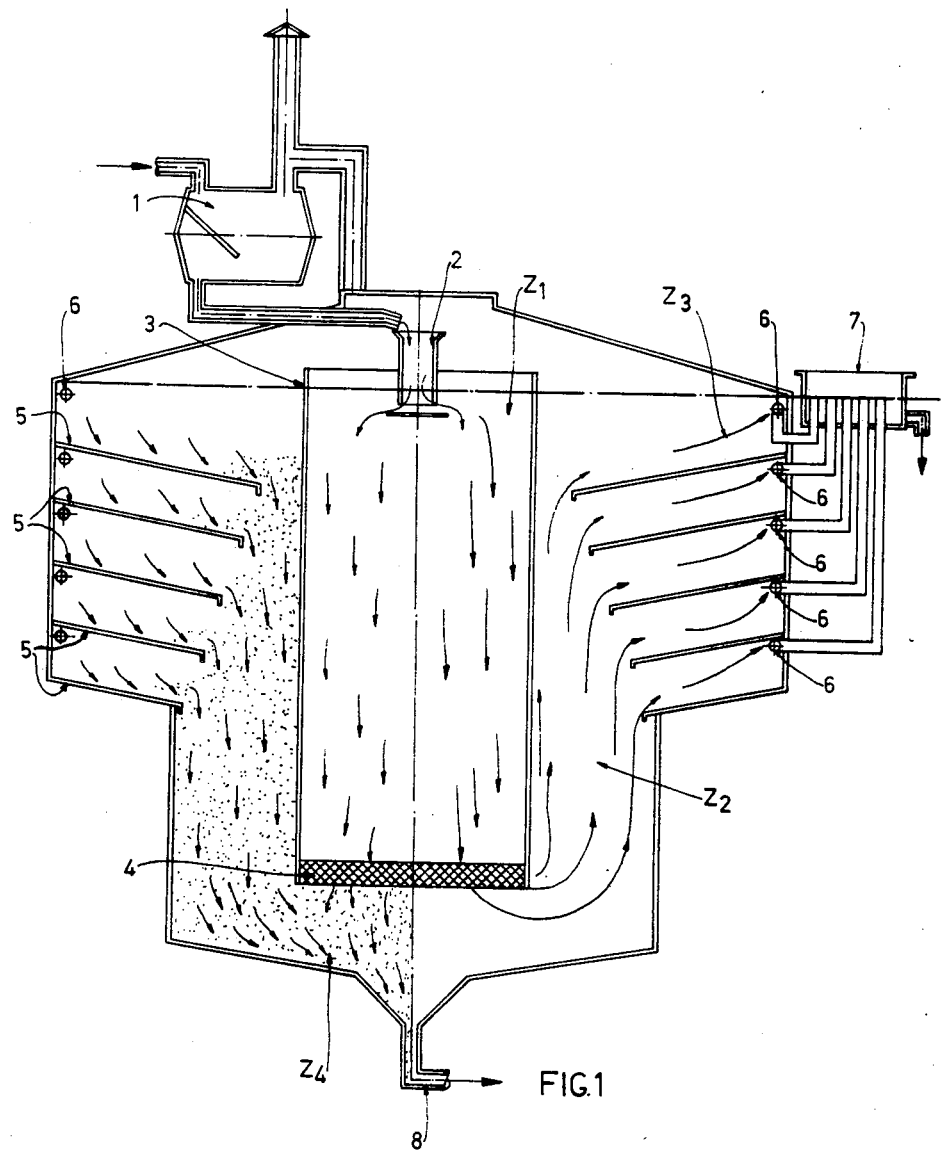

United States Patent [19]

de Mello Ribeiro Pinto

[11] 4,192,752
[45] Mar. 11, 1980

[54] CONTINUOUS DECANTATION CLARIFIER FOR LIQUIDS CONTAINING SUSPENDED SOLIDS

[76] Inventor: Luiz A. C. de Mello Ribeiro Pinto, Bandeirantes Ave. 384, 14100 Ribeirao Preto, Sao Paulo, Brazil

[21] Appl. No.: 877,967

[22] Filed: Feb. 14, 1978

[51] Int. Cl.² .............................................. B01D 21/14
[52] U.S. Cl. .................................... 210/298; 210/312; 210/523
[58] Field of Search ............... 210/513, 522, 523, 528, 210/298, 312

[56] References Cited

U.S. PATENT DOCUMENTS

| | | | |
|---|---|---|---|
| 1,454,916 | 5/1923 | Arbuckle | 210/513 |
| 2,343,836 | 3/1944 | Weber | 210/528 X |
| 2,355,875 | 8/1944 | Lasseter | 210/528 X |
| 2,479,126 | 8/1949 | Lipscomb | 210/522 X |
| 2,889,927 | 6/1959 | Van Note | 210/522 X |

*Primary Examiner*—William A. Cuchlinski, Jr
*Attorney, Agent, or Firm*—Steinberg & Blake

[57] ABSTRACT

A continuous decantation clarifier, wherein liquid to be clarified flows slowly and homogeneously into the interior of the clarifier, includes a first zone through which the liquid initially passes while the liquid is subjected to homogenization and flocculation, this first zone being penetrated in a substantially vertical descending direction by a second zone where the direction of liquid flow is reversed so that the liquid moves in an ascending vertical direction through flakes and solids in suspension in the liquid. In this latter zone such flakes and solids precipitate toward the bottom of the clarifier. The latter having a third zone wherein liquid commences to flow radially in an outward substantially horizontal direction, across frustoconical surfaces or trays, in which the decantation is concluded, the clarified liquid being collected close to the outer peripheries of the trays.

7 Claims, 2 Drawing Figures

CONTINUOUS DECANTATION CLARIFIER FOR LIQUIDS CONTAINING SUSPENDED SOLIDS

The present invention relates to a continuous decantation clarifier which operates to provide efficient and very fast clarification of sugar juices, such as are employed in the production of sugar, although it can be utilized for treating other liquids containing suspended decantable solids.

The principle of the clarifier of the invention does not follow the classical concept of multiple trays decanters, wherein liquid to be decanted is fed continuously from above down through a central shaft, in the interior of a single cylinder from which it flows radially outwardly to chambers of frusto-conical form, commonly called "trays", and wherein the solids are deposited by simple decantation, the solids being swept along the bottoms of the trays by mechanical action and being returned to the central shaft through which they descend to the bottom where they form a thick mud or sludge which, in turn, is also removed continuously through the bottom of the device, the clean juices being collected in the upper periphery of each tray.

The clarifier of the invention carries out decantation on trays by intense coalescence of the decantable particles, which coalescence is attained by an upward movement of the liquid to be decanted through a cloud of mud particles suspended in the liquid, these particles being in slow upward movement. Such system provides a true phenomenon of juice filtration wherein the smaller mud particles which, due to their high specific surface areas, are entrained by the upward movement of the juice, when crossing the cloud of larger particles already in downward movement by virtue of the smaller specific surface areas thereof, and collide with the former and adhere to them by the coalescence phenomenon, increasing the size of the larger particles and thereby accelerating progressively their downward speed.

This phenomenon provides for quick and perfect clarification, resulting in a cleaner and clearer juice in a considerably reduced total period of time as compared with prior known processes, which is a very important factor in sugar production.

Figure 2:
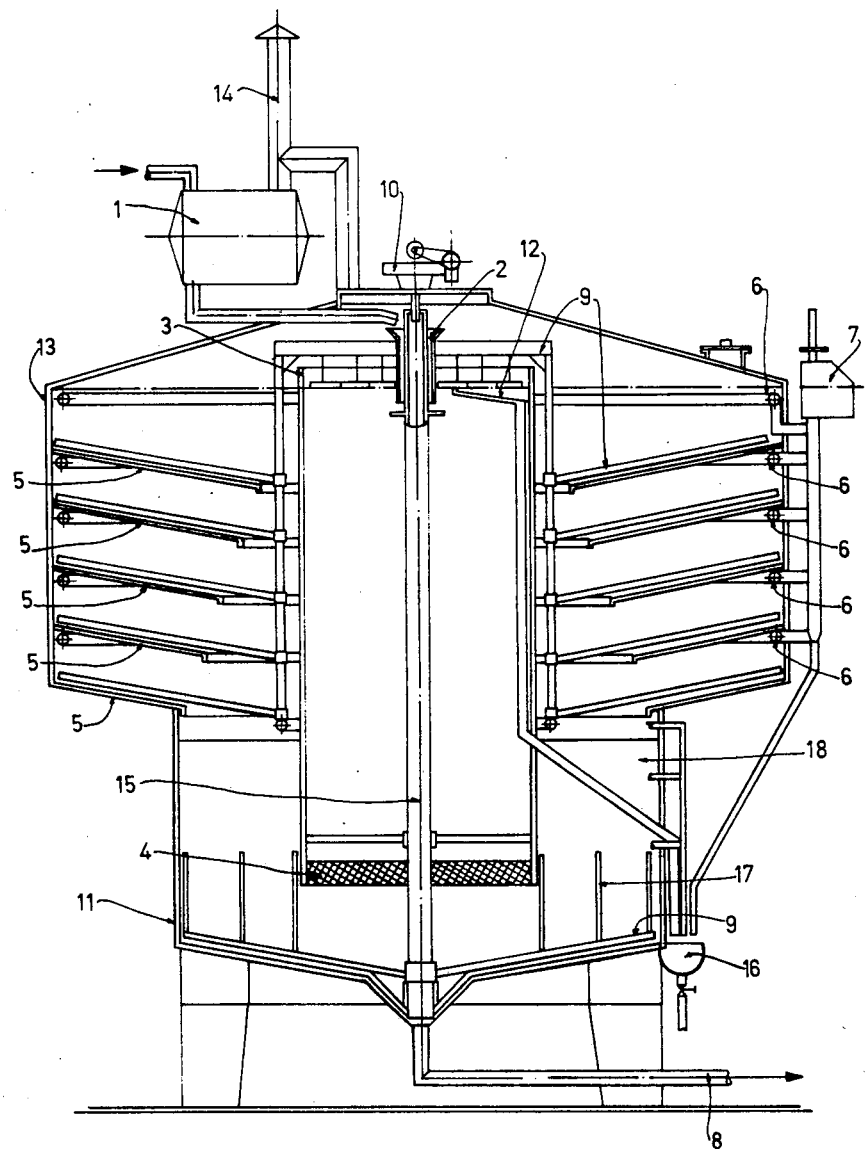

The balance of the above described conditions is attained by the special drawing of the device which permits the maintenance of methodical and absolutely homogeneous circulation of the juice within the device a fundamental condition for its effecient functioning. For a better understanding of the invention, it will be described further, by way of example, with reference to the accompanying drawings, wherein:

FIG. 1 is a diagrammatic sectional elevation of a preferred embodiment of the continuous clarifier of the invention, this figure illustrating in its right hand half and by means of long arrows, the movement direction of clean juices and, in its left hand half and by means of short arrows, the paths of the solids in their decantation movement; and FIG. 2 is a view similar to FIG. 1, but illustrating the continuous clarifier in more detail.

As shown in the drawings, the illustrated embodiment of the continuous decantation clarifier in accordance with the invention basically comprises an internal cylinder 3, mounted vertically by a support 18 at the center of a cone frustum assembly formed by an intermediate cylinder 11, of diameter larger than the internal cylinder 3, having a conic bottom and supporting, in its upper part, a series of conical surfaces or tilted trays 5 of annular shape equally spaced in the vertical direction. These trays have central openings having internal diameters which diminish progressively for successively higher trays, i.e., the higher the tray 5, the smaller the internal diameter of the tray 5, the smallest of these internal diameters still being larger than the external diameter of the internal cylinder 3 and terminating at their external peripheries at an external vertical cylinder 13 whose diameter is larger than the diameters of the cylinders 3 and 11. Upon the external cylinder 13, there is a cone-shaped lid supporting a central mechanism 10 for rotating the mechanical means comprising a central vertical axle 15, radial arms and supports 9 connected to rotary scrapers 9, and to a mud stirrer 17, to scrape respectively the upper surfaces of the trays 5, and the bottom of the device.

Sugar juice, coming from a flash reservoir 1, is fed to the device through a radial distributor 2, disposed in a central position in the internal cylinder 3 and projecting downwards below the normal surface of liquid within the cylinder 3 when the apparatus is working, the lower end of the internal cylinder 3 being masked by a screen or punched plate 4.

The apparatus further includes an upper gas outlet 14, a lower central outlet 8, at the bottom of the cylinder 11, for removal of mud or sludge, a collecting box with thickness 12 on the upper part of the internal cylinder 3 and at least one lower foam collecting gutter 16 for receiving foam collected by said upper box 12.

At the outer peripheries of the trays 2, and at the respective levels thereof, means are provided for removal a cleaned juice through respective overflow pipes or collectors 6 that conduct the cleaned juice to a clean juice collecting box 7.

In the above-described construction in the apparatus of the present invention, three different zones are defined, which zones are slowly and methodically transversed by the juices to be clarified. These 3 zones are: a flocculation and homogenization zone Z1; filtration and coalescence zone Z2; and final decantation zone Z3.

The flocculation and homogenization zone Z1 is defined by the central internal cylinder 3. The juices from the distributor 2 pass downwardly through this zone 21, being caused to flocculate at the same time that it mixes and homogenizes, eliminating any small differences of temperature and density. In this stage or step, of the process which takes place in the apparatus, precipitation of mud flakes just commences, while any high density particles (sand, for example) quickly gravitate toward the bottom. At the outlet of this zone Z1, the juice is uniformly distributed in radial sense, with a small pressure loss created by the screen or plate 4.

The filtration and coalescence zone Z2, external and concentric to the flocculation zone Z1, is defined by the space limited by the internal cylinder 3 and by the lower or intermediate cylinder 11. In such zone Z2, the juice reverses its direction of movement and starts flowing upwards during which, it crosses a "cloud" of mud particles, part suspended in the liquid and in descending movement of decantation. In its descent, the small mud flakes collide, coalesce and precipitate, increasing their dimensions and speed of precipitation as they get lower and lower.

The final decantation zone Z3 is constituted by the trays 5, arranged above and concentrically to the filtration and coalescence zone Z2. In this zone Z3, final clarification of the juice occurs in that the mud particles, still entrained by the upward movement of the juices, are separated through decantation when the juice is flowing radially, the particles being deposited upon the trays 5. The mud on the trays 5 is mechanically swept by means of scrapers 9 toward the center of the device, and falls methodically and uniformly into the filtration and coalescence zone Z2, already in the form of large coalescend particles. The clean juice is then removed along the upper external peripheries of the trays 5 by means of the overflow pipes or collectors 6 and is collected in the clean juice collecting box 7.

The apparatus further has a fourth zone Z4, located at the bottom thereof, where mud particles gather and concentrate, being swept to the central round outlet 8 by the mechanical scrapers 9, the mud being continuously removed in concentrated form.

What I claim is:

1. A continuous decantation clarifier, comprising means for defining a vertically extending first zone for directing liquid to be clarified downwardly so that the liquid is subjected to homogenization and flocculation, means for defining a vertically extending second zone adjacent to said first zone which receives the liquid from the lower end of said first zone and for directing the same in a vertically upward direction, said second zone being arranged adjacent to a third zone for receiving mud particles separated from the liquid in said third zone which mud particles are directed downwardly in the second zone to collide and coalesce with flakes and solids in suspension in the liquid in said second zone, said flakes and solids precipitating toward the bottom of the apparatus and means for defining said third zone including at least one frustoconical surface arranged adjacent to said second zone for receiving the liquid from the second zone and directing the liquid radially outwardly in a substantially horizontal direction, the mud particles being separated from the liquid in said third zone whereupon said mud particles are directed into said second zone where said particles are directed downwardly to collide and coalesce with the flakes and solids in suspension in the liquid in the second zone, the clarification liquid being collected close to the outer pheripheries of said at least one surface.

2. A clarifier as claimed in claim 1, wherein said first, second and third zones are substantially mutually concentric, the first zone being central, the second zone being external to the first zone and the third zone being arranged above and externally of said second zone.

3. A clarifier as claimed in claim 1, or 2, which further includes a fourth zone at the bottom of the device, substantially not transversed by the liquid to be decanted, but provided with a lower central outlet for removal of mud concentrating in said zone.

4. A clarifier as claimed in claim 1, wherein the flow of liquid through the device is homogenized by the provision of a radial distributor in upper central position and resting below the surface of the liquid, and a section of screen or punched plate forming the lower adjoining wall of said first zone of flocculation and homogenization.

5. A clarifier as claimed in claim 1 and which comprises an internal cylinder defining said first zone and vertically suspended at the center of a frusto-conical assembly formed by a external lower cylinder, defining said second zone, having a diameter larger than that of the internal cylinder with its conical bottom and supporting in its upper part a series of frusto-conical surfaces or trays each in the shape of a ring equally vertically spaced said rings having internal diameters which decrease the higher the ring, the internal diameters being larger than the external diameters of the internal cylinder 3 and ending, in the external peripheries thereof, by a vertical cylinder with diameter larger than the diameters of the two first mentioned cylinders defining said third zone the assembly of cylinders being closed in the upward direction by a conical lid and said fourth zone being defined by the conical bottom of the external lower cylinder.

6. A clarifer as claimed in claim 5, which includes rotary scrapers to scrape the upper surface of the trays and the bottom of the external lower cylinder leading any mud that deposits therein slowly and gradually toward the centre of the device.

7. A clarifer as claimed in claim 5, or 6, which further includes means permitting removals of clean juice through adjustable overflow pipes arranged on the exterior periphery of the trays, and collecting gutters of foam on the surface of the liquid in the interior of said first zone.

* * * * *